*Inventor*
ROBERT WALTER REICH

By Toulmin & Toulmin
*Attorneys*

United States Patent Office 3,336,537
Patented Aug. 15, 1967

3,336,537
VOLTAGE AND TEMPERATURE COMPENSATION FOR OSCILLATORS USING FORWARD POLED DIODES
Robert Walter Reich, Merzhauserstr. 143, Freiburg im Breisgau, Germany
Filed June 8, 1964, Ser. No. 373,468
Claims priority, application Germany, Feb. 26, 1964, R 37,312
6 Claims. (Cl. 331—116)

This invention relates to electronic clocks or watches and is particularly concerned with a circuit arrangement for compensating for voltage variations in the supply voltage source, and for the variation of transistor characteristics on account of temperature changes.

It is known that electronic clocks and watches show a variation according to temperature changes and according to the change in the applied battery voltage. The factors affected, namely the amplitude and frequency of the oscillating element of the clock, are critical with respect to regulation of the clockwork, and accordingly, such changes must be compensated for in some manner. The factors can vary because of changing battery voltage, such as dropping of the voltage of the battery as it is used, and they can also be changed by the change in the characteristics of the transistor means in the circuit because of temperature changes.

Transistors can be selected having a low amplification factor, but the operation of the transistor will change with temperature because the gate voltage for the base of the transistor will change by about two millivolts for each degree of temperature change of the transistor. A change of this nature will directly bring about a change in the amplitude in the oscillating element, and therefore in the frequency of the element. If, for example, the necessary transistor opening voltage is raised to the point that the voltage developed in the excitor coil is no longer sufficient to open the transistor, the clockwork will come to a halt. On the other hand, when the required opening voltage drops, the amplitude of the oscillating element will increase because more and more current is supplied from the transistor to the driving coil. This tends to be an additive effect because the greater the amplitude of the oscillating element, the greater the voltage induced in the excitor coil on account of the increased velocity of the magnetic elements which induce the voltage in the excitor coil. The net result is that most electronic clocks have time-keeping characteristics proportional to the battery voltage and also proportional to the ambient temperature of the clockwork.

It has been attempted to improve the regulation of such clockworks by eddy current brakes and by elements which cause an attenuation on account of eddy currents. Such eddy current attenuation will interfere with free harmonic oscillations of the oscillating member and for attaining exact time are therefore objectionable. Still further, eddy current devices of this nature may be employed only for relatively narrow voltage ranges, for example, where the battery voltage changes only by 5/10 of a volt. Because of this limitation on an eddy current type of control device, results thereof have never been satisfactory, and the batteries can only be used for a short length of time, namely, until the voltage changes more than what is compensated for by the device.

In particular, with an arrangement of this nature, the battery consumption is high so that the brake device will still operate at the lowest permissible battery voltage. This reduces the life of the battery and still does not compensate entirely for voltage variation from varying temperature conditions.

With the foregoing in mind, the present invention has as an object the provision of a simple efficient arrangement for use in connection with electronic clockworks which will compensate for wide variations in battery voltage and which will compensate for variations in the characteristics of the control transistor of the circuit because of temperature changes.

In general, the present invention proposes the provision of rectifier means having a well defined threshold voltage by-passing the driving coil or by-passing both the driving coil and the excitor coil of the clockwork circuit to limit one or both of the current flow to the driver coil and the voltage impulses from the excitor coil to the base of the transistor to a predetermined maximum.

The invention further proposes the provision of a plurality of rectifier means of the nature referred to in series in the by-pass, particularly selenium or silicon rectifiers, so that the system can be adapted to any given supply voltage from that of a dry cell up to the voltage supplied by wet cells which might be 6, 12 or more volts.

The nature of the present invention will be more clearly understood upon reference to the accompanying drawings, wherein.

Figure 1:
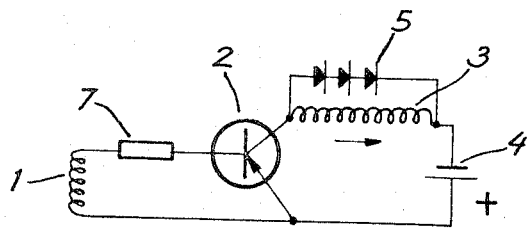
FIGURE 1 shows diagrammatically the electric circuit pertaining to electronic clockwork or watchwork.

In the drawings, 1 represents the excitor coil which is influenced by magnet means on the oscillating element of the clockwork in such a manner as to develop a voltage pulse that will be supplied to the base of transistor 2. Transistor 2 has connected in the collector-emitter circuit thereof the driver coil 3 pertaining to the oscillating element of the clockwork and the supply source of voltage 4 which may be a battery. The battery 4 is in series with coil 3 and is poled so its negative terminal is on the collector side and its positive terminal is on the emitter side.

According to this invention, there is connected in shunting relation to driver coil 3, the rectifier or diode means 5, which has a predetermined threshold voltage so that the rectifier or diode means 5 effectively limits the amount of current that will be supplied to driving coil 3. The voltage of the voltage source 4 can vary over wide limits, and substantially the same current will always be supplied to driver coil 3 whenever transistor 2 is opened, or turned on, by a pulse from excitor coil 1. Since the current in coil 3 is limited to substantially a predetermined maximum amount, it follows that the voltage thereacross will also be limited.

If battery voltage 4 is high there will be a by-passing of current through the rectifier or diode means 5 in a greater amount, whereas if the voltage of the source 4 drops, there will be less current by-passed through the diode or rectifier means 5, but always substantially the same amount of current will be supplied to drive means 3. By this arrangement the conditions established by driver coil 3 for actuating the oscillating element of the clock is made absolutely stable and extremely accurate time will therefore be kept by the clockwork.

Figure 3:
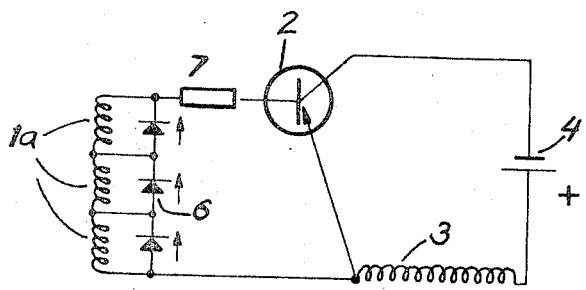

The present invention may also be advantageously applied as shown in FIGURE 3 by placing rectifier or diode means 6 across excitor coil 1, the diode or rectifier means being phased, or poled, in the proper direction, of course, to by-pass current from coil 1 when the current is of the polarity to open transistor 2. The rectifier or diode means 6 is so adjusted that the maximum voltage of the pulse developed in excitor coil 1 is always about the same, whereby the transistor is not opened up to such a degree that voltage source 4 will expend a great deal of energy in by-passing current through rectifier or diode means 5.

The transistor 2 can further be stabilized by the provision of a resistor 7 in the base circuit which will provide for a substantially constant voltage of the pulse to the transistor. The rectifier or diode means 5 could be in the form of a single diode or could be a plurality of diodes in series depending on the characteristics of the diodes used and the voltage of the supply source 4 and the voltage developed in excitor coil 1. The rectifier or diode means 5 is always poled to pass current in the same direction as the coil it bypasses, namely from the positive end of the coil toward the negative end thereof. Such rectifier or diode means are well known and exhibit a high resistance below the threshold voltage and a low resistance above the threshold voltage.

Selenium diodes or rectifiers, for example, might have a threshold voltage of $5/10$ volt each so that where voltage source 4 was in the form of a dry cell having a starting voltage of about 1.6 volts, diode means 5 would take the form of two selenium diodes in series so that the voltage supply to driving coil 3 would amount to one volt. This means that the battery could be employed until its voltage dropped to less than one volt before any change would occur in the driving conditions established by the driving coil.

If a higher voltage is employed, this can be accommodated by increasing the number of diodes in series.

It will be appreciated that elements such as decimal diodes cannot be employed because they require a higher voltage for operation than is always available, particularly with electric watch mechanisms. For this reason, it is preferred to employ selenium or silicon diodes so that a small gating or threshold voltage for each diode is had whereby the source can be accommodated to all electric clockworks whether driven with a small voltage, such as a dry cell, or from a higher voltage, such as from a multiple cell wet battery.

Still further, the selenium or silicon diodes have a sharp knee or threshold point therein which also differentiates these diodes from decimal diodes.

As to the resistor 7, this could vary in resistance from two thousand up to about fifty thousand ohms as may be necessary to accommodate the resistor to the amount of excitor current desired. A resistor of this nature will limit the pulse from the excitor coil even though there is a substantial change in the opening voltage of the transistor on account of temperature change thereof.

Figure 4:
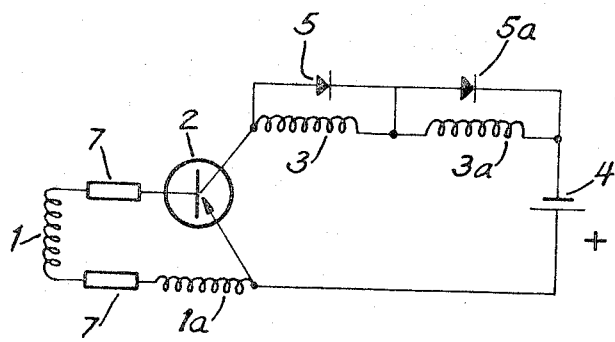
FIGURE 4 shows an arrangement like that of FIGURE 1 by illustrating how a plurality of driving coils could be used in the circuit.

As will be seen in FIGURE 4, there could be additional driver coils 3a connected in the circuit and one bank of diode means 5 could be shunted across all of the driving coils, or each driving coil could have its own shunting diode means as indicated at 5a for driving coil 3a. In any case, the operation electrically of the system is stabilized so that with a simple uncompensated circuit, the oscillating element of the clockwork is actuated under constant conditions.

Figure 2:
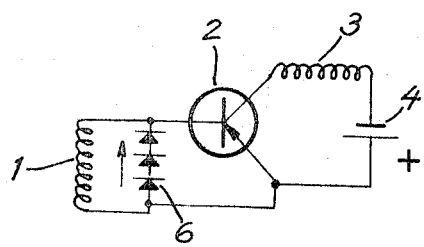
FIGURES 2 and 3 show rectifier elements that can be employed in the circuit.

FIGURE 3 shows a modification in which the diode means 6 comprises a plurality of diodes which are placed in series as shown and are shunted across individual exciter coils 1a. The diode means 6 is so adjusted that the maximum voltage of the pulse developed in the exciter coil means is always about the same as previously explained in connection with FIGURE 2.

The silicon or selenium elements employed might have a diameter of only two millimeters and thickness of only $2/10$ of a millimeter so that the diode elements can be made up quite simply and quite cheaply, and will be extremely compact. The cost of such a diode or rectifier is considerably lower than would be encountered if control or compensation by means of capacitors or eddy current brakes were attempted. In addition, control according to the present invention compensates for much wider variations, and this is more efficient than would be possible with heretofore known devices. The current compensation is reduced and the battery therefore lasts longer and more accurate time is kept by the mechanism because the oscillating element is free to oscillate in a perfectly harmonic manner.

It will be understood that this invention is susceptible to modification in order to adapt it to different usages and conditions; and accordingly, it is desired to comprehend such modifications within this invention as may fall within the scope of the appended claims.

I claim:

1. An amplifier circuit for an electronic clock or watchwork, said circuit comprising a transistor, exciter coil means in the base-emitter circuit of the transistor and driver coil means in the emitter-collector circuit of the transistor, said transistor being made conductive by current pulses from the exciter coil means and operable to release driving current pulses to said driver coil means, a source of voltage in the form of a primary dry cell in series with said driver coil means to supply said driving current pulses to said driver coil means, and rectifier means in parallel with said driver coil means, said rectifier means having a predetermined threshold voltage less than the voltage of said dry cell and below which the rectifier means has a high resistance and above which the resistance of the rectifier means decreases rapidly with increasing voltage, said rectifier means being forwardly poled only so as to pass current in the same direction as the effective pulse of current pertaining to the said driver coil means thereby to bypass around the driver coil means current in excess of a predetermined maximum amount so as to maintain said driving current pulses supplied to said driver coil means substantially constant over a relatively wide range of voltage variation of said source of voltage.

2. The arrangement according to claim 1 in which said rectifier means are in parallel with said driver coil means and said arrangement further comprising a resistance between said exciter coil means and the base of said transistor.

3. The arrangement according to claim 1 in which said rectifier means comprise elements of one of selenium and silicon.

4. The arrangement according to claim 3 in which said elements are in the form of a plurality of like rectifier elements in series and the number of said elements being substantially equal to the maximum desired to be established across the driver coil means divided by the threshold voltage of the individual rectifier elements.

5. The arrangement according to claim 1 in which said driver coil means comprises a plurality of driver coils connected in series.

6. The arrangement according to claim 5 in which said rectifier means comprises a diode in parallel with each said driver coil.

References Cited

UNITED STATES PATENTS

| | | | |
|---|---|---|---|
| 2,959,746 | 11/1960 | Sears | 331—116 |
| 3,002,138 | 9/1961 | Byrnes et al. | 58—28 |
| 3,026,458 | 3/1962 | Freystedt et al. | 58—28 |
| 3,293,568 | 12/1966 | Ganter et al. | 331—116 |

FOREIGN PATENTS

| | | |
|---|---|---|
| 1,109,615 | 6/1961 | Germany. |

OTHER REFERENCES

Motorola, Inc., Silicon Zener Diode and Rectifier Hand Book, pages 98, 99, second edition.

ROY LAKE, *Primary Examiner.*

JOHN KOMINSKI, *Examiner.*